US007933816B2

(12) United States Patent
Gardner

(10) Patent No.: US 7,933,816 B2
(45) Date of Patent: Apr. 26, 2011

(54) SYSTEM AND COMPUTER PROGRAM PRODUCT FOR GLOBAL COMPENSATION OF EMPLOYEES

(75) Inventor: Thomas George Gardner, Cold Spring, KY (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 11/350,565

(22) Filed: Feb. 9, 2006

(65) Prior Publication Data

US 2007/0185790 A1 Aug. 9, 2007

(51) Int. Cl.
*G06F 15/02* (2006.01)
*G07C 1/10* (2006.01)
(52) U.S. Cl. ........................................................ 705/32
(58) Field of Classification Search ........................ None
See application file for complete search history.

(56) References Cited

U.S. PATENT DOCUMENTS

| 6,401,079 | B1 | 6/2002 | Kahn et al. | |
|---|---|---|---|---|
| 6,411,939 | B1 * | 6/2002 | Parsons | 705/35 |
| 7,529,701 | B2 * | 5/2009 | Shields et al. | 705/35 |
| 2001/0032119 | A1 | 10/2001 | Bode | |
| 2004/0049436 | A1 * | 3/2004 | Brand et al. | 705/30 |
| 2004/0138979 | A1 * | 7/2004 | Juhre et al. | 705/36 |

OTHER PUBLICATIONS

The SET Tax: a tax system for our future. CPA Journal, 76, 2, 14(18), Feb. 2006.*

* cited by examiner

*Primary Examiner* — Matthew S Gart
*Assistant Examiner* — Russell S Glass
(74) *Attorney, Agent, or Firm* — John Pivnichny

(57) ABSTRACT

An employee compensation system handles employees located world-wide using a single instance of global employee data. Compliance with various differing laws and regulations in separate countries is handled by separating and calculating unique requirements such as gross-to-net pay on a country specific basis. All other compensation tasks are processed on a global basis resulting in significant improvement and advantages over current art. Stock options and other benefits are likewise provided for using the single instance data.

5 Claims, 2 Drawing Sheets

SYSTEM AND COMPUTER PROGRAM PRODUCT FOR GLOBAL COMPENSATION OF EMPLOYEES

TECHNICAL FIELD

The invention relates generally to corporate compensation systems for employees. More particularly, the invention relates to systems designed to provide a single world-wide employee compensation capability.

BACKGROUND OF THE INVENTION

Employee compensation systems, particularly payroll systems, have been developed over time with wide-spread automation of certain steps in the overall processes. However many steps remain as a manual process requiring significant human intervention and resulting in high labor costs. Benefits administration, likewise, has been the subject of some automation, but many steps are performed manually.

The reasons for these manual steps vary with the size of the company. A large company may be able to afford the initial investment in automating a process, which a smaller company would determine to be an inefficient use of resources. Many smaller companies, for example, make use of a payroll service to handle some of these automatable but inefficient for a small single company to deploy tasks.

Even so, a large consideration in all compensation systems is compliance with a myriad of federal, state, and local tax-related and employment-related laws and regulations. Such laws and regulations are frequently changed requiring frequent maintenance of any compensation systems whether automated or manual.

Kahn et al. in U.S. Pat. No. 6,401,079 describe a system for web-based payroll and benefits administration. This development integrates an automated centralized payroll service with a web-based payroll system in an attempt to address some of the concerns noted above.

Bode describes in US Patent Application US 2001/0032119 another method and apparatus for maintaining a payroll. A roster is prepared. Then attendance information pertaining to workers is compared to the roster; and from this comparison, the payroll is prepared.

Brand et al. in US Patent Application US 2004/0049436 describe another payroll automation system. Online analysis of payroll information for a current pay period is done with payroll information from a prior period. The analysis is done before funds are disbursed for the current pay period. This analysis assists in identifying inaccurate payroll events so they may be more easily corrected.

The aforementioned US Patent to Kahn and US Patent applications by Bode and Brand are incorporated herein by reference in their entireties.

Nevertheless, in spite of these and other developments, compensation systems are inherently error-prone due to frequent changes in laws and regulations, as well as inaccurate data entry, or an error in calculations.

Because the laws and culture which leads to differing laws and regulations are different in each country, up to now, companies have developed separate compensation systems for each country in which they have a significant number of employees. A company having a global presence, for example may have 60 or more such separate compensation systems.

The term "global" shall be taken herein to mean world-wide, including the United States and Canada, most countries in Europe, Asia, Central and South America, and Mexico. Currently, most companies do not have enough employees in Central Europe, the Middle East, and Africa to justify the expense of trying to include these in a global system. This is expected to change in the future so that over time these countries will come to be included in the above definition of "global".

Large companies and payroll services, therefore, have many different compensation systems because of the large number of countries in which they have employees to compensate. Maintenance of all these separate systems is costly and inefficient. For this reason, it is desired to provide an improved compensation system which can insure compliance with the differing and sometimes conflicting laws and regulations of these differing and autonomous countries.

OBJECTS AND SUMMARY OF THE INVENTION

It is therefore a principal object of the present invention to provide a new employee compensation system and method capable of handling employees located globally.

It is another object of this invention to provide an employee compensation system having enhanced global stock option administration capabilities.

It is yet another object of this invention to provide a global employee compensation system and method capable of compliance with laws and regulations in a global manner.

It is a further object to provide such a system and method which may be implemented or deployed in a facile manner.

These and other objects are attained in accordance with one embodiment of the invention wherein there is provided a system for employee compensation, comprising; a computer system having means for storing a single instance of global employee data, global shared services input means, a country specific gross-to-net pay calculator, and global shared systems support output means.

In accordance with another embodiment of the invention there is provided a method of compensating employees, comprising the steps of; providing a computer system having means for storing a single instance of global employee data, accepting input using a global shared services input means, calculating gross-to-net pay using a country specific gross-to-net pay calculator, and generating compensation output using a global shared systems support output means.

BRIEF DESCRIPTION OF THE DRAWINGS

The forgoing and other advantages of the invention will be more fully understood with reference to the description of the preferred embodiment and with reference to the drawings wherein.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
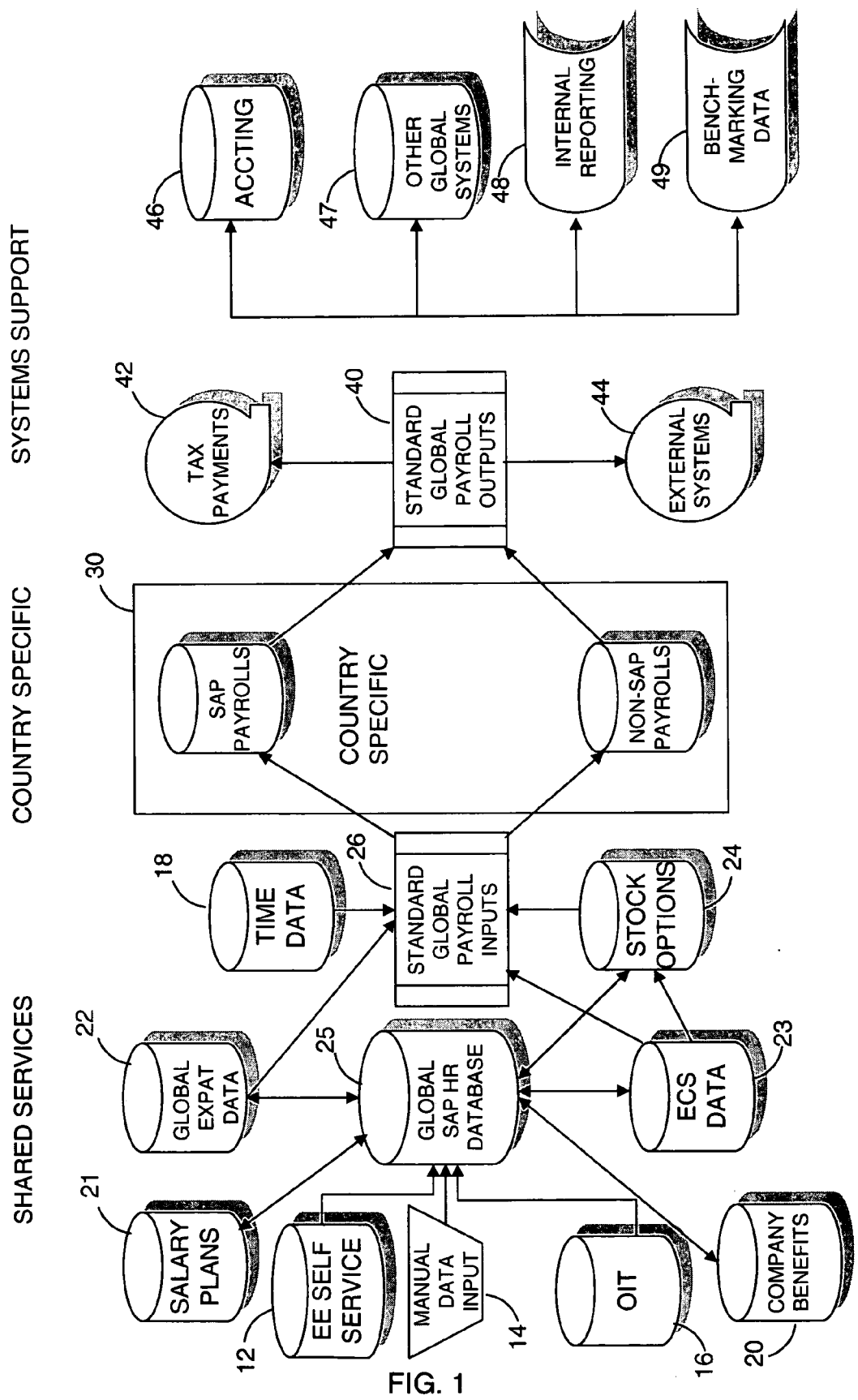
FIG. 1 is a system diagram of the present global compensation invention.

IN FIG. 1, there is shown a block diagram of an employee compensation system in accordance with the present invention. Database 25 comprises a single instance of global employee data. In one embodiment, database 25 may be located on a SAP platform (SAP is a registered trademark of SAP AG of Waldorf, Germany). Some other elements of the present invention may also be implemented on a SAP platform. However, any platform may be used without departing from the present invention as described and claimed herein. For example, a People Soft platform offered by Oracle Corp. of Redwood Shores, Calif., may be used.

Employee data may be entered in database 25 using employee self-service 12, manual data entry 14, or organization initiated transaction means 16 as shown in FIG. 1. Employee self-service shall be taken herein to mean entry by an employee into database 25 of data over which the employee has control, such as his personal residence address, phone number, number of tax exemptions, medical benefit plan selections, and the like. Organization initiated transactions are entered by a manager on behalf of an employee of data requiring management approval, such as entry of a new hire employee, salary change, termination of an employee. A manager must submit such items: the employee does not have control. Data entry by either an employee or a manger may be made using software applications 12 or 16 respectively as noted by the cylindrical shaped elements of FIG. 1. Data may also be entered manually 14 using, for example, a "dumb terminal", PDA (personal digital assistant), cell phone, or any other entry device known in the art for entering data into a database.

The single ended arrows extending from entry elements 12, 14, and 16 of FIG. 1 denote that data flow is primarily one way, from the entry element into database 25. Those of ordinary skill in this field will, of course, recognize that some data is by the nature of the entry device sent in the reverse direction for purposes of acknowledgement, verification, or confirmation of receipt by database 25. This reverse direction data is incidental and minimal, and not for the purpose of further use of the data entered.

Other software applications 20, 21, 22, 23 have bi-directional arrows coupling these to database 25. In such cases, data passes substantially in both directions. Such applications by their nature contribute employee data to database 25, as well as, make use of retrieved employee data in performing the application function.

Company benefits application 20 may handle 401K contributions, life insurance, medical benefits, retirement plan, or any other benefit offered by an employer. Salary plans application 21 may administer salary increases, decreases, salary plan changes or any other salary related matters. Global expatriate data application 22 handles payroll and other payments, e.g., moving and living expenses for employees who are working on a temporary assignment at another location in another country. Executive compensation data application 23 may handle executive bonuses in amount and form, whether deferred or not. Application 23 may also handle executive pension plan qualification, calculation, and payments.

Stock options application 24 has several novel and inventive features over known stock options systems, made practical when used in the present global compensation system and method. Most companies currently use an independent broker/administrator to handle exercise of stock options by employees. When an employee decides to exercise previously received stock options, the broker is notified. The broker sells shares and receives the proceeds from the sale. The exercise price is subtracted from the sale price and the employee is mailed a check by the broker for the difference.

In the United States and equivalently in some other countries, this difference is treated for income tax purposes as ordinary income and must be included in year-to-date employee earnings calculations for tax withholding, social security deductions and the like, and must be combined with ordinary income earned from the company by the employee who receives the exercised stock option net proceeds from the broker. Unfortunately, the broker does not know the employee's year-to-date earnings. The best that can be done is for the broker to get a file from the company, and then estimate what will be the earnings on the next pay period and select withholding amounts and social security deductions from the net stock option proceeds based on this estimate, and the amount of net proceeds. The values for the selected amounts are then sent back in a file to the company to be included in the employee's W2 report at year end. This procedure is error prone and frequently results in over or under withholding requiring further correction.

In the present invention, as shown in FIG. 1, a company using this compensation system uses a broker merely to sell shares on a daily basis. The total proceeds from the sale are sent to the company. Stock option application 24 performs the subtraction of option price from sale price and includes this difference in the employee's earning calculation. With this system, the proper amounts are withheld and deducted from the employee's total earnings as described below. The employee receives his net proceeds from exercised stock options and other earnings together in his normal payroll system. All year-to-date fields in the payroll system are correctly updated.

All of the aforementioned global shared services applications are configured to provide such services globally, i.e., to handle employees in all countries in which the company has a substantial number of employees, by a single application interacting with the single instance global employee database 25.

Element 26 performs collecting, updating, and formatting of various globally standardized inputs for use by country specific gross-to-net pay calculator 30. Such inputs are received from global expatriate date application 22, executive compensation data application 23, stock options application 24, as well as, from time data application 18 which provides actual time worked data as needed for certain employees, such as part time, temporary, non-exempt employees, and the like.

Country specific gross-to-net pay calculator 30 performs this payroll function for each employee based on their actual location using country specific laws and regulations. One or more payroll platforms may be used in implementing calculator 30. As shown the SAP platform may be used along with another non-SAP platform; however, any single platform or multiple platforms may be used. Calculator 30 is the only country specific part of the present invention. All other applications, databases, and capabilities are standardized across multiple countries, and therefore operate on a global basis. In practical terms, it has been found that over 80 percent of a compensation system for a globally situated company can be so standardized, resulting in the considerable cost and performance benefits of the present invention noted above.

Element 40 designated as standard global payroll outputs in FIG. 1, takes calculator 30 outputs, converts and reformats these to provide data to system support applications 42, 44, 46-49 according to their individual format requirements. These applications may have been developed at various times in the past, using various programming languages and may be running on any type of platform, such as the SAP or People Soft platforms noted above. Therefore element 40 provides the proper format for each application.

Most importantly, system support applications 42, 44, 46-49 are each global application applicable to and configured to support a plurality of countries, specifically the same countries for which the global shared services applications described above are configured.

Tax payments application 42 provides the necessary payments to taxing authorities, such as the US Internal Revenue Services, state and local income tax authorities, social security administration, similar taxing authorities in foreign countries, and the like, of wages withheld from employees according to applicable laws and regulations. External systems application 44 provides payments to life insurance companies, 401K plan administrators, and others which an employee may elect to have deducted from his/her wages.

Accounting application 46 receives output data from element 40 in order to properly account for wages expenses in a company's general ledger accounting system, and to assure employee wages are charged to the proper accounts on the company's books. Other global systems application 47 handles payroll deductions to be applied to an employee stock purchase plan and administration of such a plan. Internal reporting 48 and benchmarking data 49 applications receive data from element 40 and generate various reports needed within the company 48 or make comparisons of actual data to established benchmarks 49 or create new benchmarks using the actual data received from element 40.

Figure 2:
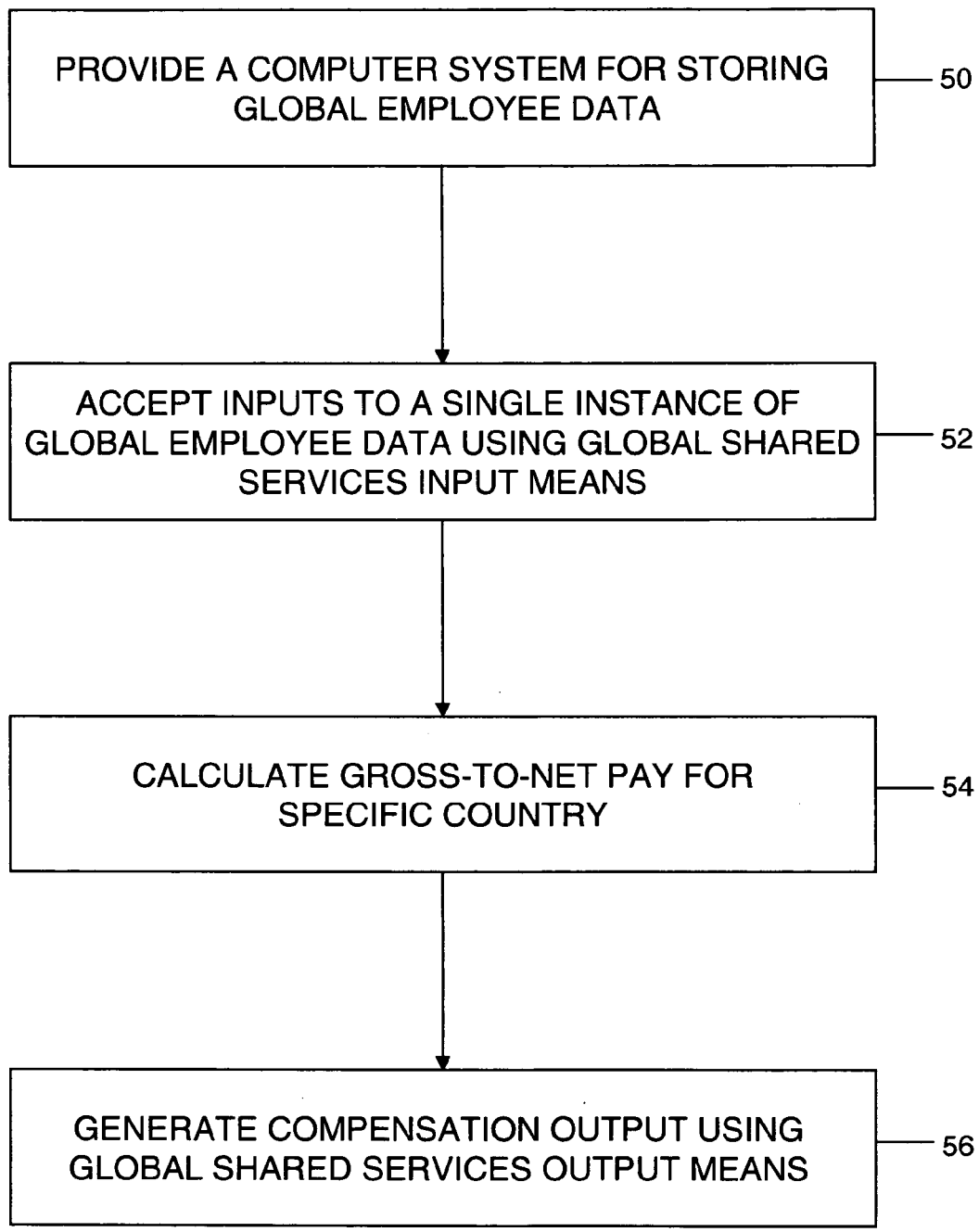
FIG. 2 is a flowchart depicting the principal steps in practicing the present invention.

In FIG. 2, there is shown a flowchart depicting the essential steps of a method of compensating employees in accordance with the present invention. In step 50, a computer system is provided for storing a single instance of global employee data in a database. Any type of computer system known in the art may be used, including but not limited to a mainframe, a server, a desktop, a distributed computer, or a laptop. The database may be any type of database, including but not limited to a hierarchical database, a relational database, a spreadsheet, or a sequential database. The database may be located anywhere the computer system has access whether on a memory device within the computer system or on a remote storage device.

In step 52, inputs to the database are accepted using any of the global shared services input applications described above and shown in FIG. 1. In step 54, gross-to-net pay is calculated using a country specific calculator. This step would be repeated for each country as needed by a globally situated company having employees located in a plurality of countries.

In step 56, compensation outputs are generated using systems support applications 42, 44, 46-49 which are each configured to operate for all applicable countries using a single application.

While there have been shown and described what are at present considered to be the preferred embodiment of the invention, it will be obvious to those skilled in the art that various changes and modifications may be made therein without departing from the scope of the invention as defined by the appended claims.

What is claimed is:

1. A system for employee compensation, comprising:
   a computer server system having only one instance of employee data for employees in the United States, Canada, Mexico, Western Europe, Asia, Central America, and South America, said employee data stored in a database residing in said server;
   a shared services input computing device, operably connected to said server, for entering employee data and manager data;
   a country specific gross-to-net pay calculator application running on said server;
   a shared services stock option calculator wherein a broker sells shares on a daily basis and sends total proceeds to said computer server system and said stock option calculator includes stock option earnings in said gross-to-net pay calculator application for employees in the United States, Canada, Mexico, Western Europe, Asia, Central America, and South America; and
   a shared systems support output application running on said server for taking outputs of said calculator and therefrom providing data to system support applications.

2. The system of claim 1, wherein said shared services input computing device includes a standard data input field for a client.

3. The system of claim 1, wherein said shared services input computing device and said shared systems support output application are each common for a plurality of companies.

4. The system of claim 1, wherein said system support applications comprise tax payments, accounting, internal reporting data, and benchmarking data applications.

5. A computer program product for instructing a processor of a computer system to compensate employees, said computer program product comprising:
   a computer readable storage medium;
   first program instructions for storing only one instance of employee data for employees in the United States, Canada, Mexico, Western Europe, Asia, Central America, and South America, said employee data in a database residing on a computer system;
   second program instructions for accepting employee data and manager data using a shared services input computing device, operably connected to said computer system;
   third program instructions for calculating gross-to-net pay using a country specific gross-to-net pay calculator application;
   fourth program instructions for calculating employee stock options using a shared services stock option calculator for employees in the United States, Canada, Mexico, Western Europe, Asia, Central America, and South America, and said only one instance of employee data and wherein a broker sells shares on a daily basis and sends total proceeds to said computer system and said stock option calculator includes stock option earnings in said gross-to-net pay calculator application; and
   fifth program instructions for generating compensation output using a shared systems support output application, and wherein
   all said program instructions are recorded on said medium.

* * * * *